United States Patent
Sibley et al.

(10) Patent No.: US 9,781,483 B2
(45) Date of Patent: Oct. 3, 2017

(54) DIGITAL OVER-THE-AIR ENTERTAINMENT SYSTEM AND METHOD FOR OPERATING THE SAME

(71) Applicant: The DIRECTV Group, Inc., El Segundo, CA (US)

(72) Inventors: Erin Sibley, Los Angeles, CA (US); William Goliff, Monterey Park, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 294 days.

(21) Appl. No.: 14/179,853

(22) Filed: Feb. 13, 2014

(65) Prior Publication Data
US 2014/0165110 A1 Jun. 12, 2014

Related U.S. Application Data

(63) Continuation of application No. 13/087,293, filed on Apr. 14, 2011, now abandoned, which is a continuation of application No. 09/564,082, filed on May 3, 2000, now abandoned.

(51) Int. Cl.

| | | |
|---|---|---|
| *H04N 7/16* | (2011.01) | |
| *H04N 21/61* | (2011.01) | |
| *H04N 7/088* | (2006.01) | |
| *H04N 21/258* | (2011.01) | |
| *H04N 21/41* | (2011.01) | |
| *H04N 21/433* | (2011.01) | |
| *H04N 21/4363* | (2011.01) | |
| *H04N 21/442* | (2011.01) | |
| *H04N 21/45* | (2011.01) | |
| *H04N 21/454* | (2011.01) | |
| *H04N 21/81* | (2011.01) | |

(52) U.S. Cl.
CPC ........ *H04N 21/6181* (2013.01); *H04N 7/088* (2013.01); *H04N 7/163* (2013.01); *H04N 7/165* (2013.01); *H04N 21/25891* (2013.01); *H04N 21/4126* (2013.01); *H04N 21/4331* (2013.01); *H04N 21/43637* (2013.01); *H04N 21/44222* (2013.01); *H04N 21/454* (2013.01); *H04N 21/4532* (2013.01); *H04N 21/6193* (2013.01); *H04N 21/812* (2013.01)

(58) Field of Classification Search
USPC .......................... 725/62–63, 67–68, 91, 100
See application file for complete search history.

(56) References Cited

U.S. PATENT DOCUMENTS

| | | | | |
|---|---|---|---|---|
| 6,408,437 | B1 * | 6/2002 | Hendricks et al. ........... | 725/132 |
| 7,546,622 | B2 * | 6/2009 | Tash ................................ | 725/46 |
| 8,139,607 | B2 * | 3/2012 | Sullivan et al. ............... | 370/468 |
| 2003/0140353 | A1 * | 7/2003 | Hugenberg et al. .......... | 725/148 |
| 2007/0214484 | A1 * | 9/2007 | Taylor et al. .................. | 725/100 |
| 2011/0167444 | A1 * | 7/2011 | Sun et al. ....................... | 725/31 |
| 2012/0066717 | A1 * | 3/2012 | Park ................................ | 725/39 |

\* cited by examiner

*Primary Examiner* — Mulugeta Mengesha
(74) *Attorney, Agent, or Firm* — Harness, Dickey & Pierce, PLC

(57) ABSTRACT

A system and method of distributing electronic content includes a network operations center communicating national feeds to an over-the-air broadcast center through a satellite. The over-the-air broadcast center receives the national feeds from the satellite and broadcasts the national feeds to a user device through a cellular tower wireless transmitter.

28 Claims, 2 Drawing Sheets

DIGITAL OVER-THE-AIR ENTERTAINMENT SYSTEM AND METHOD FOR OPERATING THE SAME

CROSS-REFERENCE TO RELATED APPLICATIONS

This application is a continuation of U.S. patent application Ser. No. 13/087,293 filed on Apr. 14, 2011 which is a continuation of U.S. patent application Ser. No. 09/564,082 filed on May 3, 2000. The entire disclosure of the above applications are incorporated herein by reference.

TECHNICAL FIELD

The present disclosure relates generally to broadcasting digital information, and more specifically, to distributing and selling electronic content to a target market.

BACKGROUND ART

Hughes Electronics Corporation provides digital direct broadcast systems such as DIRECTV® and DIRECPC™ that broadcast via satellite, television programs and information or computer applications, respectively. DIRECTV® broadcasts television programming in a similar fashion to that of terrestrial television. DIRECPC™ subscribers place requests that are queued up and broadcasted, to the subscriber's computer. DIRECPC™ services on-demand requests. DIRECTV® and DIRECPC™ incorporate encryption in addressing for applications such as on-demand requests. These systems provide access control where users make selection decisions in advance of the content being broadcast.

Another type of system, described in U.S. Pat. No. 5,790,935, issued to the present assignee, is a virtual on-demand digital information delivery system. In this system, a central distribution server directs a variety of programs to various users based upon a filtering predictive scheme located at the subscriber's local storage. During off peak hours various programs are downloaded to the subscriber's local storage.

The systems described above are all satellite-based systems. That is, each of the systems delivers content directly from a network operations center to a satellite which broadcasts the information to the users. Such systems, however, require the placement of a satellite dish on the building in which the service is used. The satellite dishes must be positioned in a location on the building so that they are positioned toward the geostationary satellite generating the broadcast signals. If the "view" to the satellite is blocked by trees or other buildings, the service cannot be used. Also, some consumers view the satellite dishes as not aesthetically pleasing.

Broadcast systems are typically not used for point-to-point information delivery services because many people must receive the same content at the same time in order for it to be cost effective. It would therefore be desirable to provide an over-the-air broadcast system to provide point-to-point information.

SUMMARY

The present disclosure may provide a system that combines satellite broadcasting with over-the-air broadcasting to bring service to both fixed and mobile users.

In one aspect of the disclosure, a system for distributing electronic content includes a network operations center communicating national feeds to an over-the-air broadcast center through a satellite. The over-the-air broadcast center receives the national feeds from the satellite and broadcasts the national feeds to a user device through a cellular tower wireless transmitter.

In a further aspect of the disclosure, a method for distributing electronic content comprises the steps of communicating national feeds to an over-the-air broadcast center from a network operations center through a satellite, receiving the national feeds at the over-the-air broadcast center from the satellite, broadcasting the national feeds through a cellular tower wireless transmitter and receiving the national feeds at a user device.

In yet another aspect of the disclosure, a method for distributing electronic content comprises the steps of encoding national feeds for communication through a satellite at a network operations center to form satellite-encoded national feeds, communicating the satellite-encoded national feeds to the satellite from the network operations center, receiving the satellite-encoded national feeds at an over-the-air broadcast center, decoding the satellite-encoded national feeds at the over-the-air broadcast center, re-encoding the national feeds to form re-encoded national feeds at the over-the-air broadcast center for transmission through a cell tower wireless transmitter, broadcasting the re-encoded national feeds through the cell tower wireless transmitter and receiving the re-encoded national feeds at a user device.

The system of the disclosure may be used with fixed and mobile user devices. The user devices, because they receive over-the-air broadcasting, are lower cost than satellite-based devices.

On-demand type service may also be offered in an over-the-air broadcast system.

Other features of the present disclosure will become apparent when viewed in light of the detailed description when taken in conjunction with the attached drawings and appended claims.

DETAILED DESCRIPTION

Figure 1:
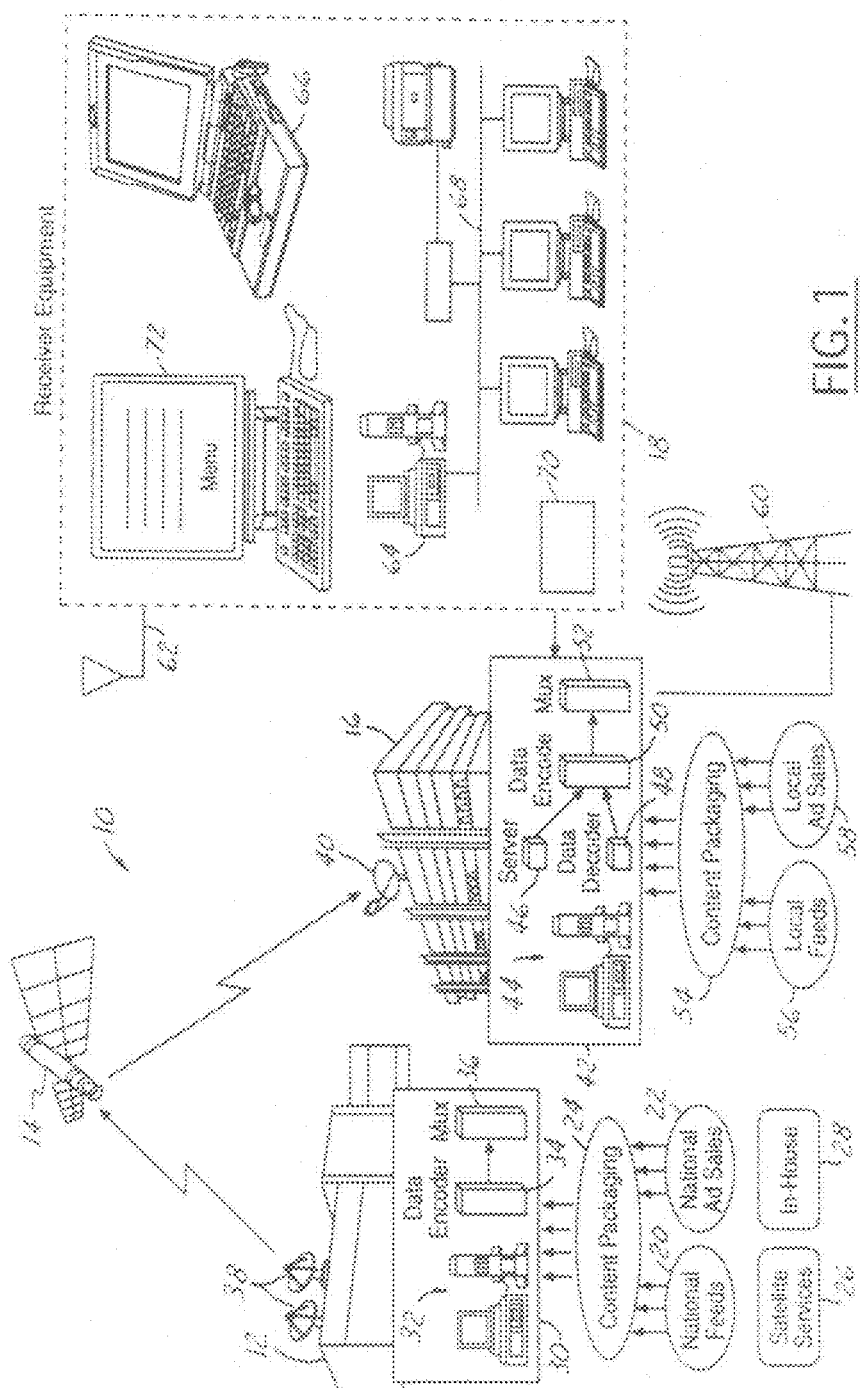
FIG. 1 is a diagrammatic view of the system architecture of a system according to the present disclosure.

In the following figures the same reference numerals will be used to identify the same components in the various views.

As described in this application, "electronic content" is meant to encompass various types of digital information including the distribution of music, videos, movies, music videos, games, advertising and promotional materials associated with the content.

Referring now to FIG. 1, electronic content distribution system 10 is illustrated. Electronic distribution system 10 generally has a network operations center (NOC) 12, a satellite 14 in communication with NOC 12, an over-the-air broadcast center 16 that is coupled to users 18 over the air. The network operations center 12 is coupled to national feeds 20 and national ad sales 22 through content packaging 24. National feeds 20 may, for example, be national "cable"

type services channels or satellite service such as DIRECPC™ or DIRECTV®. The national ad sales 22 may be derived in-house 28 or as will be further described below may be obtained from various promotional ad agencies. A content packaging block 24 is coupled to national feeds 20 and national ad sales 22. The content packaging 24 functions to couple national feeds 20 with national ad sales 22.

The network operations center 12 has a control system that includes various computers 32, a data encoder 34, and a multiplexer 36 that are coupled to antennas 38 that uplink electronic content to satellite 14. The control system 30 operates in a manner known to those skilled in the art.

Over-the-air broadcast center 16 has an antenna 40 that receives downlink signals from satellite 14. Over-the-air broadcast center 16 has a control system 42 that comprises a control computer 44, a server 46, a data decoder 48, a data encoder 50, and a multiplexer 52. Control system 42 is coupled to content packaging 54 which in turn is coupled to local feeds 56 and local ad sales 58. The over-the-air broadcast center receives downlink signals from satellite 14. Control system 42 may also receive local channel feeds through local feeds 56 and may also provide local advertising content through local ad sales 58. The local feeds 56, local ad sales 58, and downlink signals from satellite 14 are combined in control system 42. Some of the information from satellite 14 may also be stored in server 46 for on-demand broadcasting.

Control system 42 is coupled to a wireless transmitter 60 that broadcasts the wireless signals to users 18. Wireless transmitter 60 may comprise a cell tower such as that used in cellular phones, a TV tower that broadcasts digital signals or a stratospheric platform positioned above a predetermined metropolitan area for broadcasting over-the-air signals. If the wireless transmitter 60 comprises a TV tower, the channels broadcast may be excess channels for a metropolitan area allocated in HDTV format.

Users 18 are coupled to an antenna 62 used for receiving over-the-air broadcast signals. Users 18 may comprise a variety of devices such as a personal computer 64, a laptop computer 66, a network 68 or a hand-held device 70. Each of the devices may be coupled to its own antenna 62 for receiving over-the-air signals. Each device may have the antenna 62 coupled therein or may be connected to a separate antenna. Hand-held device 70 may comprise a variety of devices such as a digital media receiver, a personal digital assistant, or other type of hand-held device. Each device associated with user 18 may have a menu 72 or other selection apparatus for selecting electronic content broadcast by over-the-air broadcast center 16. Menu 72 may provide information to the user as to the current electronic content being broadcast or may provide an interface to the electronic content stored within the user device.

In operation, the network operations center 12 provides a substantial amount of the content to be broadcast by the over-the-air broadcast center 16. In an actual implementation, very few network operations centers are required. By way of example, only one network operations center 12 is provided. A substantial amount of programming is uplinked to satellite 14. Satellite 14 downlinks various electronic content to over-the-air broadcast centers 16 throughout the country. The over-the-air broadcast center 16 may also combine local content and local ads through local feeds 56 and local ad sales 58. Users 18 may also be coupled to broadcast center 16. Thus, if on-demand service is desired, broadcast center 16 through telephone wires or through a wireless medium may be contacted so that the broadcast center 16 broadcasts the information through wireless transmitter 60. As will be further described below, broadcast center 16 may track data so that affinity information may be broadcast with the electronic content so that the users may filter the electronic content and store the electronic content on the user devices.

Figures 2, 3:
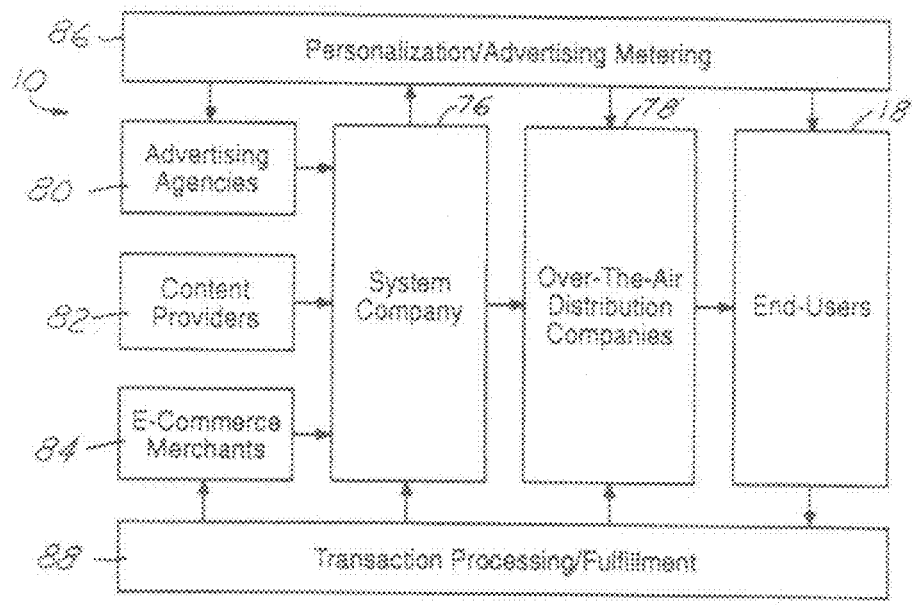
FIG. 2 is a block diagrammatic view of the business interactions of the present disclosure.
FIG. 3 is a block diagrammatic view of a user device for use in the present disclosure.

Referring now to FIG. 2, a business level view of a electronic content distribution system 10 is illustrated according to the present disclosure. The electronic content distribution system 10 is centered around a system company 76. The system company 76 is responsible for the initial broadcast and uplinking of the electronic content. The system company 76 interfaces with over-the-air distribution companies 78. The over-the-air distribution companies may be cellular phone systems, television stations, or may be a company owned system. The over-the-air distribution companies are generally coupled to the end users 18 through the over-the-air broadcast.

System company 76 may also be coupled to various outside sources such as advertising agency 80, content providers 82, and e-commerce merchants 84. The personalization/advertising metering box 86 may represent various aspects of system company, over-the-air distribution and advertising agencies 80. Although illustrated separately, box 86 may be incorporated into these other functions. Personalization/advertising metering box 86 monitors the transactions by users 18 and helps to formulate an affinity model that is used to provide affinity information along with the electronic content to end users 18 so that material likely to be desirable to the particular end users 18 may be stored at the end users 18. The end users 18 are also coupled to transaction processing/fulfillment box 88. The transaction processing/fulfillment box 88 is shown coupled to system company 76, over-the-air distribution company 78, and e-commerce merchants 84. Although illustrated as a separate box, transaction processing/fulfillment box 88 may be incorporated into system company 76, over-the-air distribution company 78, and e-commerce merchants 84.

It is envisioned that end users 18 may subscribe to a predetermined service as well as being able to request certain electronic content on demand. This may be done through the menu system as described above. Upon selecting a desired electronic content from the menu, the user device may be coupled to transaction processing/fulfillment box 88 wherein the on-demand service is paid for and wherein the over-the-air distribution system 78 broadcasts the information to the end user 18. The over-the-air distribution system may also be used to provide a decryption key to end users 18 for information stored on the user devices but is encrypted.

Advertising agencies 80 may provide targeted advertising that is coupled to various specific content of content providers 82 to particularly target a specific market.

Referring now to FIG. 3, a user device 88 is illustrated. Each user device 88 may be coupled to an antenna 62 as described above. Antenna 62 is coupled to a receiver 90 that receives the over-the-air signals and converts them into a useful format. Receiver 90 is coupled to a filter 92 that has affinity information of the user therein. Filter 92 is coupled to a memory cache 94. Memory cache 94 and filter 92 are coupled to a display 96 that is used to display menu 72. A control device 98 is coupled to display 96 to allow selections of various menu items from memory cache 94. Control 98 may also be used to select streaming content information being received at receiver 93 through filter 92. Control 98 may, for example, be a touch pad, keyboard, touch screen or other device. Control device 98 may also be coupled to the purchasing system 100 such as transaction processing/fulfillment box 88 of FIG. 2 above.

One advantage of the disclosure is that user device 88 may be mobile or fixed. That is, home users as well as mobile users such as those using hand-held devices or those with laptop computers may benefit from the system. In operation, the over-the-air broadcast center 16 broadcasts a variety of information simultaneously. Receiver 90 receives all the information and through the use of filter 92 decides whether or not to store the information in memory cache 94. The electronic content may be full rights to the electronic content, may be an encrypted from of the electronic content, or may be an indicator for menu 72 that will allow the user to make an on-demand request for the information. Filter 92 has affinity information associated therewith so that the electronic content received by receiver 90 may be screened.

In one example, the broadcasted electronic content may contain affinity information so that the filter 92 may compare the broadcasted affinity information with the affinity information within the filter and thereby store only the potentially desirable electronic content in memory cache 94. For each item stored in memory cache 94, a menu item is displayed on display 96 so that the user may select the electronic content when desired.

If full rights are not given in the electronic content, the control device 98 may select purchasing the content from purchasing system 100. Thus, the receiver 90 may receive the on-demand information and/or a decryption key. The user device through menu 72 and display 96 may be also used to select various over-the-air streaming information from over-the-air broadcast center 16.

After purchasing the electronic content, the information may be provided to advertisers and to the network operations center 12 so that affinity information may be associated with the broadcast information. Data mining techniques may be also used at the network operations center 12 so that various affinity models may be generated to target specific audiences and markets. This information will form an affinity preference model for developing affinity preference models for content downloads. These affinity models may be periodically updated and as well, the filter terms located at the user device may also be updated.

While particular examples have been shown and described, numerous variations will occur to those skilled in the art. Accordingly, it is intended that the disclosure be limited only in terms of the appended claims.

What is claimed is:

1. A method comprising:
communicating national feeds to an over-the-air broadcast center from a network operations center through a satellite;
receiving the national feeds at the over-the-air broadcast center from the satellite;
encoding the national feeds prior to transmission through a cell tower to form encoded national feeds;
broadcasting the encoded national feeds through a cell tower wireless transmitter; and
receiving the encoded national feeds at a user device.

2. The method as recited in claim 1 further comprising encoding local feeds to form encoded local feeds at the over-the-air broadcast center and encoding national feeds to form encoded national feeds at the over-the-air broadcast center.

3. The method as recited in claim 1 wherein receiving the national feeds comprises receiving the national feeds at a mobile user device.

4. The method as recited in claim 1 wherein receiving the national feeds comprises receiving the national feeds at a fixed user device.

5. The method as recited in claim 1 wherein receiving the national feeds comprises receiving the national feeds at a satellite televisions set top box.

6. The method as recited in claim 1 wherein receiving the national feeds comprises receiving encrypted national feeds and further comprising communicating a decryption key to the user device and decrypting the national feeds with the decryption key.

7. The method as recited in claim 1 wherein prior to broadcasting multiplexing the national feeds.

8. The method as recited in claim 1 wherein broadcasting the national feeds comprises broadcasting the national feeds in excess bandwidth of a digital television signal.

9. The method as recited in claim 1 further comprising broadcasting a menu from the over-the-air broadcast center to the user device through the cell tower wireless transmitter.

10. A method comprising:
encoding national feeds for communication through a satellite at a network operations center to form satellite-encoded national feeds;
communicating the satellite-encoded national feeds to the satellite from the network operations center;
receiving the satellite-encoded national feeds at an over-the-air broadcast center;
decoding the satellite-encoded national feeds at the over-the-air broadcast center;
re-encoding the national feeds to form re-encoded national feeds at the over-the-air broadcast center for transmission through a cell tower wireless transmitter;
broadcasting the re-encoded national feeds through the cell tower wireless transmitter; and
receiving the re-encoded national feeds at a user device.

11. The method as recited in claim 10 further comprising encoding local feeds at the over-the-air broadcast center to form encoded local feeds.

12. The method as recited in claim 11 wherein broadcasting comprising broadcasting the re-encoded national feeds and the encoded local feeds.

13. The method as recited in claim 10 wherein receiving the re-encoded national feeds comprises receiving the re-encoded national feeds at a mobile user device.

14. The method as recited in claim 10 wherein receiving the re-encoded national feeds comprises receiving the re-encoded national feeds at a fixed user device.

15. The method as recited in claim 10 wherein receiving the re-encoded national feeds comprises receiving the re-encoded national feeds at a satellite televisions set top box.

16. The method as recited in claim 10 further comprising communicating a decryption key to the user device and decrypting the re-encoded national feeds with the decryption key.

17. The method as recited in claim 10 wherein prior to broadcasting multiplexing the re-encoded national feeds.

18. The method as recited in claim 10 wherein broadcasting comprises broadcasting the re-encoded national feeds in excess bandwidth of a digital television signal.

19. The method as recited in claim 10 further comprising broadcasting a menu from the over-the-air broadcast center to the user device.

20. A system comprising:
a network operations center communicating national feeds to an over-the-air broadcast center through a satellite;

an encoder encoding the national feeds prior to transmission through a cell tower to form encoded national feeds; and the over-the-air broadcast center receiving the encoded national feeds from the satellite and broadcasting the encoded national feeds to a user device through a cell tower wireless transmitter.

21. The system as recited in claim 20 wherein the over-the-air broadcast center receives local feeds and the national feeds comprises encoded national feeds.

22. The system as recited in claim 20 wherein the user device comprises a mobile user device.

23. The system as recited in claim 20 wherein the user device comprises a fixed user device.

24. The system as recited in claim 20 wherein the user device comprises a satellite television set top box.

25. The system as recited in claim 20 wherein the national feeds comprise encrypted national feeds and wherein the over-the-air broadcast center communicates a decryption key to the user device and the user device decrypts the encrypted national feeds with the decryption key.

26. The system as recited in claim 20 wherein the over-the-air broadcast center comprises a multiplexer multiplexing the national feeds.

27. The system as recited in claim 20 wherein the over-the-air broadcast center broadcasts the national feeds in excess bandwidth of a digital television signal.

28. The system as recited in claim 20 wherein the over-the-air broadcast center broadcasts a menu to the user device.

* * * * *